2,563,539

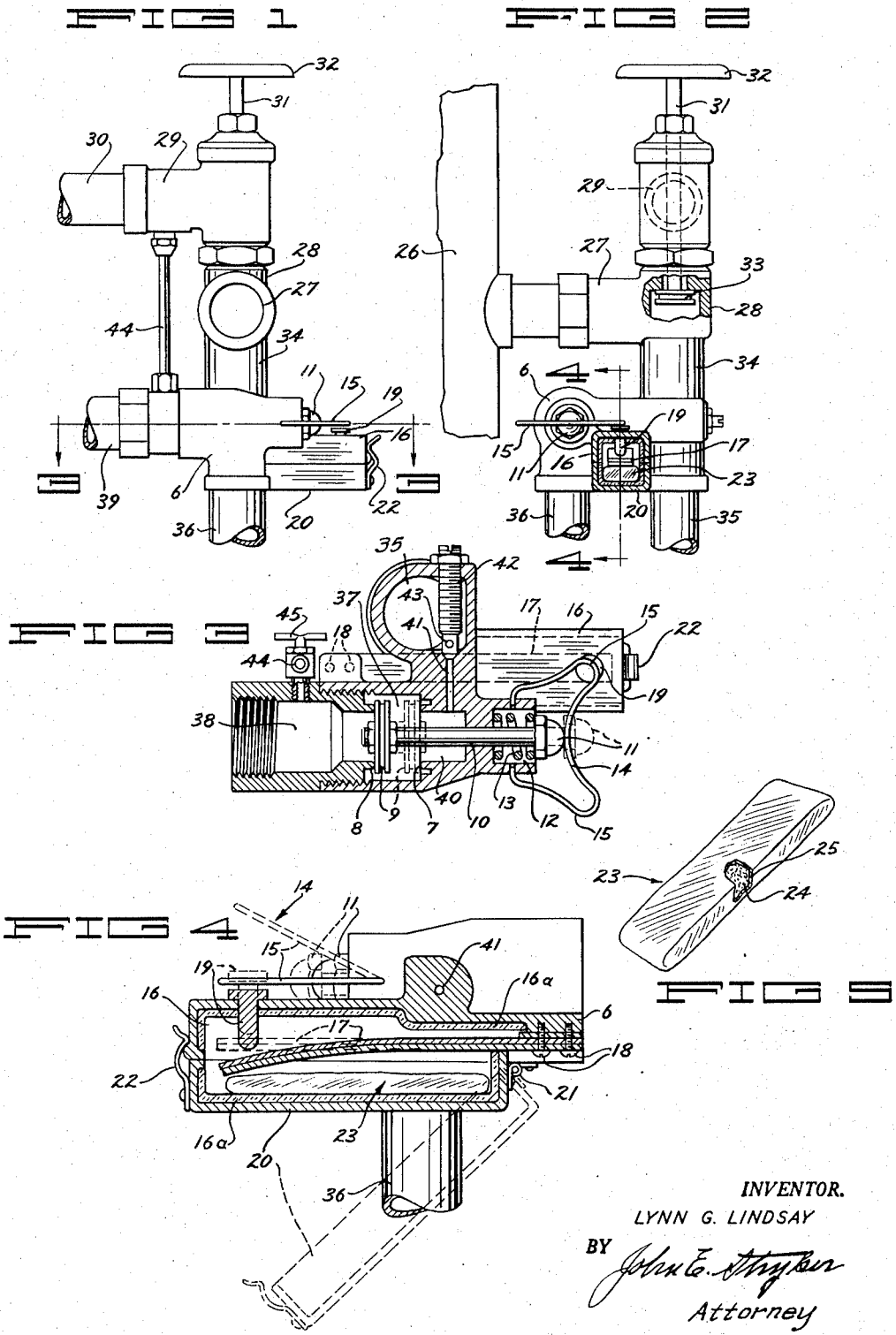
Aug. 7, 1951  L. G. LINDSAY  2,563,539
VALVE MECHANISM
Filed June 21, 1946
INVENTOR.
LYNN G. LINDSAY
BY
Attorney Patented Aug. 7, 1951

UNITED STATES PATENT OFFICE 2,563,539

VALVE MECHANISM

Lynn G. Lindsay, St. Paul, Minn.

Application June 21, 1946, Serial No. 678,446

3 Claims. (Cl. 161—7)

This invention relates to valve mechanism adapted to control the flow of a fluid through a conduit or passage and having simple means for automatically cutting off the flow or changing the direction of flow after the elapse of a predetermined period of time.

It is an object of the invention to provide valve mechanism of this type with novel, reliable and simple timing means.

A particular object is to provide in association with a valve member which is spring biased to one position and adapted to be manually set in another position, heat responsive means and a heating element adapted to cause the return of the valve member to the first mentioned position after the elapse of a predetermined period of time.

A further object is to provide water softening apparatus with a control valve of the three-port, two-way type and an improved time control therefor.

This invention also includes certain novel features of construction which will be more fully pointed out in the following specification and claims.

In the accompanying drawing a preferred embodiment of my invention is illustrated by way of example and not for the purpose of limitation, together with suitable connections for water softening apparatus.

Referring to the drawing:

Figure 1 is a rear elevational view of the valve mechanism and suitable accessory connections;

Fig. 2 is an end elevational view of the same and with portions of one of the valve casings and heating chamber broken away;

Fig. 3 is a horizontal section taken approximately on the line 3—3 of Fig. 1;

Fig. 4 is a fragmentary vertical section taken approximately on the line 4—4 of Fig. 2, and Fig. 5 is a perspective view of a suitable exothermic heating unit with a portion of the envelope broken away.

In the drawing, the numeral 6 indicates the casing of my valve mechanism which is of the three-port, two-way type formed with passages for conducting fluid and having parallel valve seats 7 and 8 for engagement with a valve head 9 constituting a closure member. As shown in Fig. 3, the head 9 is mounted on one end of a longitudinally movable rod 10 which projects from the casing 6 and is provided with a nut 11 constituting a manually operable member on its end remote from the head 9. Confined on the rod 10 within a recess 12 in the casing 6 is a coiled spring 13 arranged to bias the head 9 to closed position against its seat 7.

A detent indicated generally by the numeral 14 is constructed from spring wire and has a pair of arms 15 pivotally connected to opposite sides of the casing 6. This detent is adapted to be moved to an operative position wherein it engages the nut 11 to retain the head 9 in closed position with respect to its seat 8, as indicated in Fig. 3. When the detent is moved upward from this operative position it releases the valve stem 10 and allows the spring 13 to move the head 9 to closed position on the seat 7.

Carried by the casing 6 and separate from the passages for liquid therein is a chamber 16 containing a heat responsive element 17 of the simple bi-metallic type. One end of this element is anchored by means of screws 18 to the valve casing 6 and the other end is free to oscillate and is arranged to actuate a pin 19 which projects from the upper wall of the chamber 16 to engage an arm 15 of the detent 14. When the element 17 is at room temperature it remains in the elevated, broken line position shown in Fig. 4 and thereby retains the pin 19 in its upwardly extended position wherein it obstructs the movement of the detent 14 to operative position. The lower side of the chamber 16 is provided with a closure 20 which extends beneath the element 17. This closure has a hinge connection 21 at one end with the casing 6 and is provided with a spring latch 22 at its other end adapted to engage a small lug on the outer surface of the chamber 16. A lining 16a of suitable heat insulating material is provided on the interior surfaces of the chamber 16 and closure 20.

The chamber 16 is adapted to receive an exothermic timing unit indicated generally by the numeral 23. As indicated in Fig. 5, this unit comprises a body 24 of chemical heating composition contained in a suitable envelope 25 and is preferably of the type which is caused to generate heat when water is added. The chemical reaction continues for a definite period of time which is dependent upon the size and composition of the body 24. Suitable elevated temperatures may be maintained for any desired period ranging from a few minutes to several hours.

Chemical heating compositions suitable for my purpose are known in the art of permanently waving hair and in the body heating art including chemical heating pads adapted for use as substitutes for hot water bottles. Examples of United States patents describing compositions which may be adapted for my purpose are the following:

No. 2,040,406, granted May 12, 1936, to Raymond E. Reed; No. 2,040,407, granted May 12, 1936, to Raymond E. Reed; No. 1,910,874, granted May 23, 1933, to Ziegler et al.; No. 1,760,102, granted May 27, 1930, to Baker; and No. 1,613,120, granted January 4, 1927, to O'Neal et al.

Measured quantities of any suitable heating composition are placed in pervious envelopes, preferably constructed from a textile fabric or paper for use individually in controlling my valve mechanism. The heat reaction may be started by moistening the unit 23, as by immersing it momentarily in water. It is then placed in the chamber 16 where it is supported on the closure 20. After a brief period of time the heat from the exothermic element causes the element 17 to move downward together with the pin 19. Thereupon the valve head 9 may be manually closed against the seat 8 and the detent 14 placed in engagement with the nut 11 to retain the valve in adjusted position temporarily or until the element 17 has cooled sufficiently to cause it to move upward, thereby actuating the pin 19 and detent 14 upward. Upward movement of the detent 14 frees the nut 11 and valve stem 10 and allows the spring 13 to move the valve head 9 instantaneously to its closed position against the seat 7.

When my invention is used in connection with water softening apparatus to control the period of regeneration, the exothermic timing unit 23 maintains a predetermined elevated temperature in the chamber 16 for the period required for regeneration and flushing of the water softening material. This period is ordinarily equal to from one-half to about three-quarters of an hour.

Connections adapting the valve mechanism hereinbefore described for use in the control of water softening apparatus are shown in Figs. 1, 2 and 3 of the drawing. This apparatus includes a tank 26 through which the water to be softened is caused to flow and containing water softening material requiring periodic regeneration. The upper portion of the tank 26 is shown connected to a branch 27 of a valve casing 28 and hard water may be supplied to the casing 28 through a branch 29 and pipe 30. A valve operating stem 31 is provided with a manually operable handle 32 and carries a head 33 (Fig. 2) which is movable to an upper position in which it cuts off the supply of hard water to the casing 28 from the branch 29 and is also movable to a lower position wherein it cuts off direct communication between the branch 27 and a downwardly extending branch 34 of the casing in communication with a drain pipe 35. In communication with the tank 26 at an elevation below the body of softening material therein is a pipe 36 extending upward to a chamber 37 (Fig. 3) formed in the valve casing 6. Soft water may be discharged from the casing 6 through a port 38 and service pipe 39 (Figs. 1 and 3) and there is a port 40 communicating with the drain pipe 35 through a restricted passage 41. Disposed in axial alignment with the passage 41 is a screw 42 formed with a passage 43 the size of which determines the rate of flow from the chamber 40 to the drain pipe 35.

To by-pass water from the supply pipe 30 to the service pipe 39, I provide a small pipe 44 under control of a needle valve 45, the upper end of the pipe 44 being connected to the branch 29 of the casing 28 and the lower end being connected to the port 38 through the valve 45. This needle valve has a small passage which is continuously open to allow only sufficient water to pass into the port 38 to balance the pressure on opposite faces of the valve head 9 when the latter is closed against its seat 8 and the service outlets from the pipe 39 are closed. The tank 26 is preferably provided at the top with a removable cap or manhole and cover, such, for example, as that shown in my Patent No. 2,347,201, permitting the placing of a charge of regenerating material, e. g., common salt, within the top of the tank.

During the normal water softening operation the valve head 9 remains closed against its seat 7 and the valve head 33 is closed against its lower seat so that hard water passes into the upper portion of the tank 26 from the pipe 30, through the valve branches 29 and 27. In passing downward through the softening material in the tank 26, the water is softened and it then flows from the bottom of the tank up through the pipe 36 and through the valve chamber 37 past the seat 8 and through the port 38 and service pipe 39. Flow through the by-pass pipe 44 is so restricted by the valve 45 that only a negligible amount of hard water reaches the service pipe 39 through the pipe 44.

When it is desired to regenerate the body of softening material in the tank 26, the valve handle 32 is first turned upward to cut off the passage of hard water to the softening tank, except for the small amount which flows through the pipe 44 and needle valve 45. Now the tank cap or manhole cover (not shown) is removed and water is allowed to drain from the top of the tank through the branches 27 and 34 to the drain pipe 35. Thereupon a charge of regenerating material (such as common salt or other required reagent) is placed in the tank 26 through the manhole or cover opening and the cover is closed and secured in place.

To set my improved time control for the regenerating and flushing cycle, the operator moistens or otherwise starts the chemical heating reaction in one of the heating units 23 and places it on the closure 20 which is then closed to confine the unit in heating relation to the heat responsive element 17. After a brief delay which is ordinarily on the order of a few seconds or less than one minute, sufficient heat is generated to cause the element 17 to be drawn downward, thus allowing the pin 19 to move downward out of the path of the spring detent 14. The valve head 9 is then closed against its seat 8 by manipulation of the nut 11 against the action of the spring 13 and the valve is held in this position by moving the detent 14 to its operative position in engagement with the nut 11, as shown in full lines in Fig. 4. The mechanism remains in this position for a predetermined period of time during which the element 23 produces sufficient heat to retain the element 17 in its retracted position with respect to the pin 19 and detent 14. At the end of this period sufficient cooling of the element 17 takes place to cause it to move upward and to actuate the pin 19 to disengage the detent 14 from the nut 11. Upon release of the nut 11, the spring 13 moves the valve head 9 quickly from its closed position against the seat 8 to its closed position against the seat 7, thus automatically returning the apparatus to normal water softening operation.

Regeneration of water softening material in the tank 26 takes place during the period when the valve head 9 remains closed against its seat 8. During this period hard water from the pipe 30 flows into the upper portion of the tank 26 through the valve branches 29 and 27 and carries the brine or other regenerating solution downward through the body of water softening material. The spent solution flows upward through the pipe 36 to the chamber 37 and out through the port 40, passages 41 and 43 into the drain pipe 35 at a rate determined by the size of the passage 43. This spent solution is followed by flushing water and the duration of the regenerating the flushing treatment is determined by the chemical heating unit 23. This unit may be replaced by a new one when regeneration is again required.

During regeneration the pressure on opposite faces of the valve head 9 is balanced by allowing a small amount of water to flow through the pipe 44 and valve 45 into the port 38 while the opposite face of the head 9 is subject to the same fluid pressure. I thus guard against the holding of the head 9 in contact with its seat 8 with sufficient fluid pressure to prevent the expansion of the spring 13 when the head 11 and rod 10 are released by the detent 14.

Periodically it may be desirable to backwash the body of water softening material in the tank 26. This may be accomplished with the apparatus shown in Figs. 1 to 3 inclusive by merely opening the valve 45 and turning the valve handle 32 upward to close the head 33 against its upper seat thereby placing the upper portion of the tank in communication with the drain pipe 35 through the branches 27 and 34. With the valve head 9 closed against its seat 7, wash water enters the bottom of the tank through the by-pass pipe 44, valve 45, port 38, chamber 37 and pipe 36. To return the apparatus to the water softening phase of operation, the positions of the valve head 33 and needle valve 45 are reversed, that is to say, the head 33 is closed against its lower seat and the valve 45 is moved to its partially closed or flow restricting position.

An important advantage is derived by my arrangement for automatically operating the head 9 at the end of the regenerating and flushing period with a quick movement from a closed position on its seat 8 to a closed position on its seat 7. This prevents the flow of a substantial amount of hard water into the service pipe 39 at any time during regeneration and flushing.

The present invention is an improvement on the inventions described and claimed in my Patents Nos. 2,347,202, 2,347,203 and 2,347,204 and in my applications Serial No. 642,847, filed January 23, 1946 and Serial No. 661,940, filed April 13, 1946, now abandoned.

The exothermic composition for my purposes may be supplied in the form of small capsules, tablets or pads which are inexpensive and reliable in operation. Such units are adapted for use where accuracy in the time control period is important and they are not affected by variations in atmospheric conditions or in the temperature, pressure, velocity or chemical composition of the fluid under control. My valve mechanism may be used to control the flow of gases as well as liquids in valve passages and conduits for purposes and in arrangements differing radically from those specifically described herein, without departing from the spirit of my invention as defined in the appended claims.

Having described my invention, what I claim as new and desire to protect by Letters Patent is:

1. Valve mechanism comprising, a valve member movable manually to a predetermined position, resilient means for actuating said member to a second position, a detent operative to retain said valve member in the first mentioned position and movable to a valve release position, a heat responsive element disposed to actuate said detent and exothermic timing means operative through said heat responsive element and detent to release said valve member from said first mentioned position upon the elapse of a predetermined period of time.

2. Valve mechanism comprising, a valve member movable manually to a predetermined position, resilient means for actuating said member to a second position, a detent operative to retain said valve member in the first mentioned position and movable to a release position, a heating chamber, a heat responsive element operatively connected to said detent and contained in said chamber, and an exothermic timing unit adapted to be placed in said chamber and to heat said element for a predetermined period of time.

3. Valve mechanism comprising, a valve member movable manually to a predetermined position, resilient means for actuating said member to a second position, a detent operative to retain said valve member in the first mentioned position, a heating chamber extending adjacent to said detent, a bi-metallic heat responsive element operative to move said detent to a valve release position and contained in said chamber, and an exothermic timing unit adapted to be placed in said chamber to heat said element for a predetermined period of time and thereby retain said valve member in said first mentioned position for a corresponding period of time.

LYNN G. LINDSAY.

REFERENCES CITED

The following references are of record in the file of this patent:

UNITED STATES PATENTS

| Number | Name | Date |
| --- | --- | --- |
| Re. 22,660 | Evans et al. | Aug. 7, 1945 |
| 910,221 | Niemann | Jan. 19, 1909 |
| 2,196,393 | Ireland | Apr. 9, 1940 |
| 2,247,964 | Reynolds | July 1, 1941 |
| 2,292,801 | Slidell | Aug. 11, 1942 |
| 2,322,520 | Jenkins | June 22, 1943 |
| 2,347,201 | Lindsay | Apr. 25, 1944 |
| 2,367,402 | Kelly | Jan. 16, 1945 |